United States Patent
Nagahama et al.

[11] Patent Number: 5,719,732
[45] Date of Patent: Feb. 17, 1998

[54] OVERLOAD PROTECTING DEVICE

[75] Inventors: Tsuneo Nagahama, Kyoto; Tatsuya Mizobata, Suita, both of Japan

[73] Assignee: Tsubakimoto Chain Co., Osaka, Japan

[21] Appl. No.: 767,346

[22] Filed: Dec. 16, 1996

[30] Foreign Application Priority Data

Dec. 14, 1995 [JP] Japan .................. 7-326068

[51] Int. Cl.$^6$ .................. H02H 5/04
[52] U.S. Cl. .................. 361/29; 361/110; 318/434
[58] Field of Search .................. 361/23, 24, 28, 361/29, 30–31, 33, 110; 318/434, 453, 484

[56] References Cited

U.S. PATENT DOCUMENTS 4,268,884  5/1981  Ford, Jr. et al. .................. 361/22
4,412,162  10/1983  Kitamura .................. 318/563

*Primary Examiner*—Jeffrey A. Gaffin
*Assistant Examiner*—Michael Sherry
*Attorney, Agent, or Firm*—Darby & Darby

[57] ABSTRACT

An overload protecting device which includes a comparator 11 to which an output voltage V10 in proportion to the current flowing through a motor 5 and a start detecting reference voltage E11 are inputted, and a comparator 13 to which the output voltage V10 and an overload detecting reference voltage E13 are inputted, a starting timer 14 for clocking a first period of time T1 lapsing since the output of a signal from the comparator 11, an overload timer 14 for clocking a second period of time T2, which is shorter than the first period of time T1, lapsing since the output of a signal from the comparator 13, a transient finish detecting circuit 300 for outputting a signal V33 representing a finish of transient of the motor 5 finish based on signal outputted from the comparators 11 and 13, and an overload trip relay 18 for cutting off a motor current to the motor 5 through the logical operation of the signal V33 representing motor transient finish or an output signal V12 from the starting timer 12, with an output signal V14 from the overload timer 14. The driving mechanism driven by the motor 5 is properly protected from the overload.

2 Claims, 4 Drawing Sheets

OVERLOAD PROTECTING DEVICE

BACKGROUND OF THE INVENTION

1. Field of the Invention

The present invention relates to an overload protecting device for preventing a motor-driven driving mechanism such as a conveyor from being overloaded.

2. Description of Related Art

FIG. 1 is a circuit diagram showing a circuitry system used in a conventional overload protecting device designed to protect the driving mechanism from being overloaded, and a motor driving circuit. The 3-phase motor 5 is connected to a 3-phase power source (not shown) having phases U, V and W to drive a driving mechanism such as a conveyor (not shown) through circuit breakers 1 and electromagnetic contactors 2. A thermal relay 3 is provided in each of the U and W phase lines between the electromagnetic contactor 2 and the motor 5, and a current transformer 4 in the V-phase line therebetween.

The output of the current transformer 4 is inputted to a rectifier smoothing circuit 10, and the D.C. voltage V10 outputted from the rectifier smoothing circuit 10 is inputted to a positive input terminal (+) of each of a start detecting comparator 11 and an overload detecting comparator 13. A start detecting reference voltage E11 is applied to a negative input terminal (−) of the comparator 11 by dividing a voltage of control power source CE by resistances 21 and 22. An overload detecting reference voltage E13 is applied to a negative input terminal (−) of the comparator 13 by dividing the voltage of control power source CE by the variable resistor 23.

An output signal V11 of the comparator 11 is inputted to a starting timer 12, and an output signal V13 of the comparator 13 is inputted to an overload timer 14. The starting timer 12 is an on-delay timer designed to prevent a motor current from being cut off as a result of mistaking a starting current of the motor 5 for an overload. It clocks a longer predetermined period of time T1 than the starting time of the motor 5. The overload timer 14 is an on-delay timer which clocks a period of time for which overloading continues to prevent a motor current from being cut off by an overload for an instance.

The output signal V12 of the starting timer 12 is inputted to one input terminal of an AND circuit 15, and an output signal V14 of the overload timer 14 is inputted to the other input terminal of the AND circuit 15. An output signal V15 of the AND circuit 15 is inputted to a base of a transistor 16 whose emitter is grounded. A collector of the transistor 16 is connected to a control power source CE through an overload trip relay 18 to which a flywheel diode 17 is connected in parallel. A serial circuit of a normally closed contact 18b of the overload load trip relay 18, a stop button switch 7, a starting button switch 6, an electromagnetic coil 2c of the electromagnetic contactor 2, and a normally closed contact 3b of the thermal relay 3 is connected between one terminal of the A.C. power source AC and the other terminal thereof. A self-holding normally open contact 2a of the electromagnetic contactor 2 is connected to the starting button switch 6 in parallel.

An overload protecting device 20 is constructed with the rectifier smoothing circuit 10, the resistors 21 and 22, the variable resistor 23, the comparators 11 and 13, the starting timer 12, the overload timer 14, the AND circuit 15, the transistor 16, the overload trip relay 18, the flywheel diode 17 and the normally closed contact 18b.

The operation of the overload protecting device 20 will be described with reference to a timing chart of FIG. 2:

By closing the starting switch 6 with the circuit breaker 1 being closed, the electromagnetic coil 2c is excited and the electromagnetic contactor 2 is closed, so that the 3-phase motor 5 is started by flowing the motor current I. The current transformer 4 detects the motor current I supplied to the driven motor 5, and the detected current I is inputted to the rectifier smoothing circuit 10. The rectifier smoothing circuit 10 outputs the voltage V10 in proportion of the motor current I.

The comparator 11 compares the output voltage V10 of the rectifier smoothing circuit 10 with the start detecting reference voltage E11 divided by the resistances 21 and 22 as shown in FIG. 2(b). When the result of comparison becomes V10>E11, the output signal V11 of the comparator 11 turns into H (high) level as shown in FIG. 2(c). This indicates that the start of the motor 5 has been detected. As shown in FIG. 2(c), the output signal V11 is kept at H level while the motor current I flows.

The starting timer 12 starts to clock when the output signal V11 turns into H level, and when the predetermined period of time T1 is clocked, the output signal V12 of the starting timer 12 turns into H level. The overload detecting comparator 13 compares the output voltage V10 of the rectifier smoothing circuit 10 in proportion to the motor current I with the overload detecting reference voltage E13 obtained by being divided by the variable resister 23. When the result of comparison becomes V10>E13, the output signal V13 of the comparator 13 turns into H level as shown in FIG. 2(e).

Because the output voltage V10 of the rectifier smoothing circuit 10 exceeds the overload detecting reference voltage E13 at the start of the motor 5 and also during the presence of an overload, the output signal V13 of the comparator 13 turns into H level as shown in FIG. 2(e). When the output signal V13 of the comparator 13 turns into H level, the overload timer 14 starts to clock a predetermined lapsed period of time T2, and when the lapsed period of time T2 is clocked, the timer 12 turns the output signal V14 into H level.

When the output signal V12 of the starting timer 12 and the output signal V14 of the overload timer 14 both turn into H level, the overload trip signal V15 which is the output signal of the AND circuit 15 turns into H level. As a result, the transistor 16 is turned on, and the overload trip relay 18 is excited, thereby opening the normally closed contact 18b. By opening the normally closed contact 18b, the electromagnetic contactor 2 is opened through the demagnetization of the electromagnetic coil 2c, thereby cutting off the motor current I. In this way, the motor 5 stops, thereby protecting the driving mechanisms from being overloaded.

(A) in FIG. 2 shows that during the period of time shown therein the motor 5 starts, and that an overload OL is generated after the predetermined lapsed time T1 is clocked by the starting timer 12. (B) in FIG. 2 shows that during the period of time shown therein an excessive motor current continues to flow after the starting timer 12 clocks the predetermined lapsed time T1 subsequent to the starting of the motor 5 because the motor 5 starts under an overload or the predetermined lapsed time T1 is too short to be clocked by the starting timer 12. (C) in FIG. 2 shows that during the period of time shown therein the overload OL is generated before the starting timer 12 finishes clocking the predetermined period of time T1 subsequent to the starting of the motor 5.

As is evident from the foregoing, according to the conventional overload protecting device 20, when both the output signal V12 of the starting timer 12 and the output signal V14 of the overload timer 14 turn into H level, the overload trip signal V15 shown in FIG. 2(g) is outputting from the AND circuit 15 to cut off the supply of the motor current I to the motor 5 through the excitation of the overload trip relay 18. As a result, in the cases shown in periods (A) and (B) in FIG. 2, the motor 5 is stopped and the driving mechanism driven by the motor 5 is protected from being overloaded.

However, in the case shown in the period (C) in FIG. 2, when an overload OL is generated before the starting timer 12 finishes clocking the predetermined period of time T1 subsequent to the start of the motor 5, the signal inputted to the AND circuit 15 does not turn into H level unless the starting timer 12 clocks the predetermined period of time T1, which means that the AND circuit 15 does not output an overload trip signal V15. Thus the motor current continues to flow through the motor 5. In this way, when an overload occurs before the starting timer 12 clocks the predetermined period of time T1, the driving mechanism driven by the motor 5 will not be protected from the overload.

The starting time of the motor 5 differs depending upon circumstantial conditions such as a loading condition, ambient temperatures, and the source voltage. This difference in circumstantial conditions requires that the period of time T1 to be clocked by the starting timer 11 must be changed depending upon circumstantial conditions. This is disadvantageously troublesome.

SUMMARY OF THE INVENTION

The present invention has been made to solve the problems pointed out above, and it is an object to provide an overload protecting device capable of protecting a driving mechanism from an overload occurring thereon before the starting timer clocks a predetermined lapsed period of time, without the need of changing the period of time to be clocked by the starting timer depending upon circumstantial conditions.

The overload protecting device of the present invention comprises: voltage detecting means for detecting a voltage relating to a current supplied to a motor; first reference voltage generating means for generating a first reference voltage higher than a first voltage detected by the voltage detecting means during the normal operation of the motor and lower than a second voltage detected by the detecting means during the transients of the motor; second reference voltage generating means for generating a second reference voltage higher than the first reference voltage and lower than the second voltage; first comparing means for comparing a voltage detected by the voltage detecting means with the first reference voltage, and outputting a first comparison result when the detected voltage is higher than the first reference voltage; second comparing means for comparing a voltage detected by the voltage detecting means with the second reference voltage, and outputting a second comparison result signal when the detected voltage is higher than the second reference voltage; first clocking means for clocking a first period of time lapsing since the generation of the first comparison result signal; second clocking means for clocking a second period of time lapsing since the generation of the second comparison result signal, the second period of time being shorter than the first period of time; a motor transient finish detecting circuit for detecting the finish of a transient of the motor and outputting a transient finish signal when the generation of the second comparison result signal finishes during the generation of the first comparison result signal; and current cutting-off means for cutting off the supply of a motor current when the second clocking means finishes clocking the period of time after the first period of time is clocked by the first clocking means, and when the second clocking means finishes clocking the second period of time after the transient finish signal is generated during the clocking of the first period of time by the first clocking means.

The transient finish detecting circuit of the overload protecting device of the present invention comprises: a first circuit for generating a signal having a predetermined time width at the time when the output of the second comparison result from the second comparing means finishes; and a second circuit for making the current cutting-off means cut off the supply of a current to the motor when the second clocking means finishes clocking the second period of time after output of the motor transient finish signal during the clocking of the first period of time by the first clocking means by cancelling clocking of the first clocking means during the period of time from the generation of the having a predetermined time width from the first circuit up to the termination of the generation of the first comparison result signal.

In the overload protecting device of the present invention, the voltage detecting means takes out a voltage relating to the current supplied to the motor. The first comparing means compares a voltage detected by the voltage detecting means with a first reference voltage which is higher than a first voltage detected by the voltage detecting means during the normal operation of the motor and lower than a second voltage detected by the voltage detecting means during the transients of the motor, and outputs a first comparison result signal when the first reference voltage is higher than the voltage detected by the voltage detecting means. The second comparator compares a voltage detected by the voltage detecting means with a second reference voltage which is higher than the first reference voltage and lower than the second voltage, and outputs a second comparison result signal when the second reference voltage is higher than the voltage detected by the voltage detecting means. As a result, the first clocking means starts to clock a first period of time lapsing since the moment of the generation of the first comparison result signal, and the second clocking means starts to clock a second period of time, which is shorter than the first period of time, lapsing since the moment of the generation of the second comparison result signal, the second period of time being shorter than the first period of time. In this situation, the transient finish detecting circuit detects the finish of transient when the generation of the second comparison result signal finishes during the generation of the first comparison result signal. Then the cutting-off means cuts off the supply of the motor current when the second clocking means finishes the clocking of the second period of time after the first clocking means finishes clocking the first period of time, and when the second clocking means finishes clocking the second period of time after the transient finish signal is generated during the period of time for which the first clocking means clocks the first period of time.

In the transient finish detecting circuit used in the overload protecting device according to the present invention, the first circuit generates a signal having a predetermined time width when the generation of the second comparison result signal finishes, and a second circuit makes the current cutting-off means cut off the supply of a current to the motor when the clocking of the second period of time by the second clocking means finishes after the transient finish signal is generated during the clocking of the first period of time by the first clocking means by canceling the first period of time clocked by the first clocking means during the period of time from the generation of the signal having the predetermined time width from the first circuit up to the termination of the generation of the first comparison result signal.

The above and further objects and features of the invention will more fully be apparent from the following detailed description with the accompanying drawings.

DESCRIPTION OF THE PREFERRED EMBODIMENTS

Figure 1:
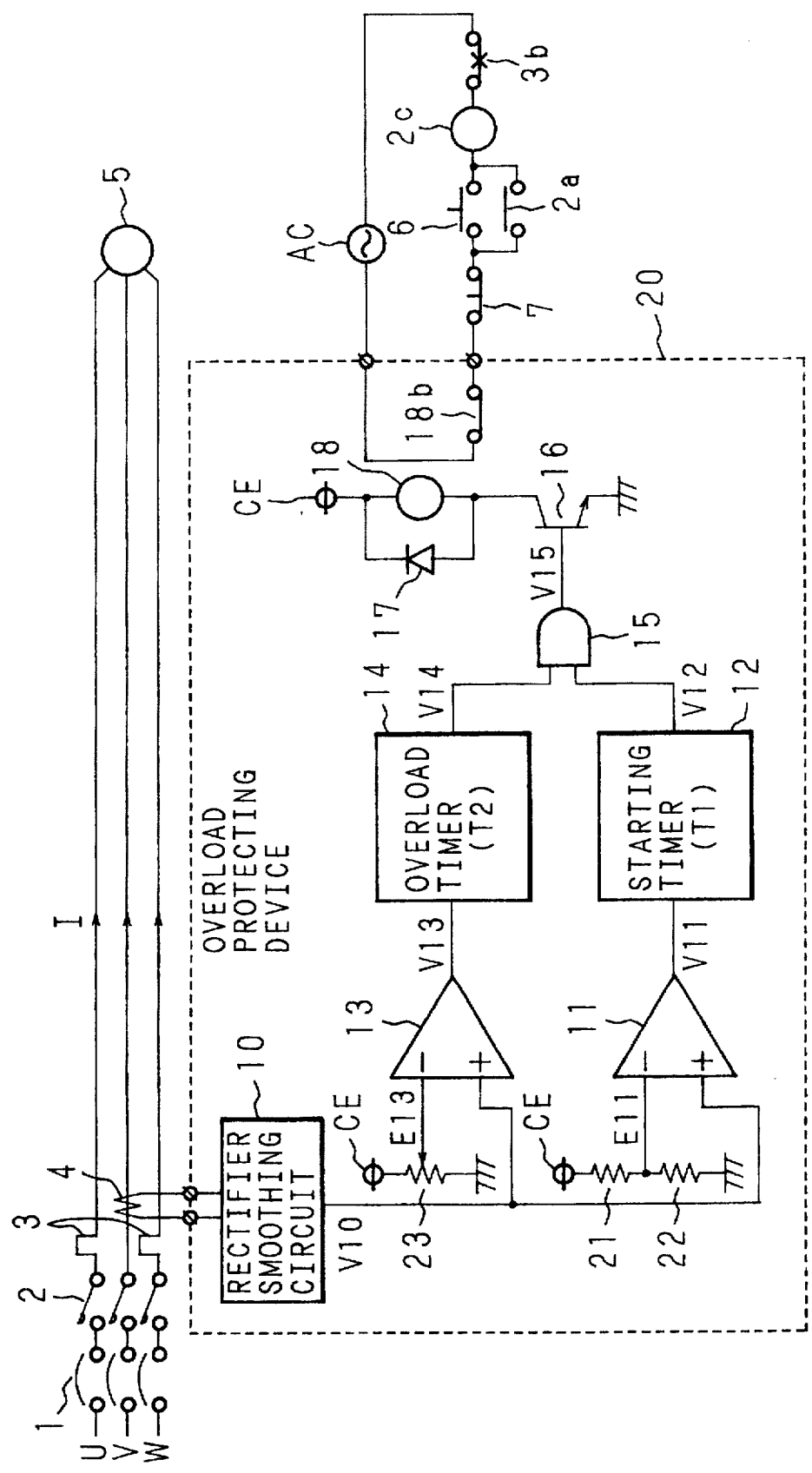
FIG. 1 is a circuit diagram showing a motor driving circuit including a conventional overload protecting device.
Figure 2:
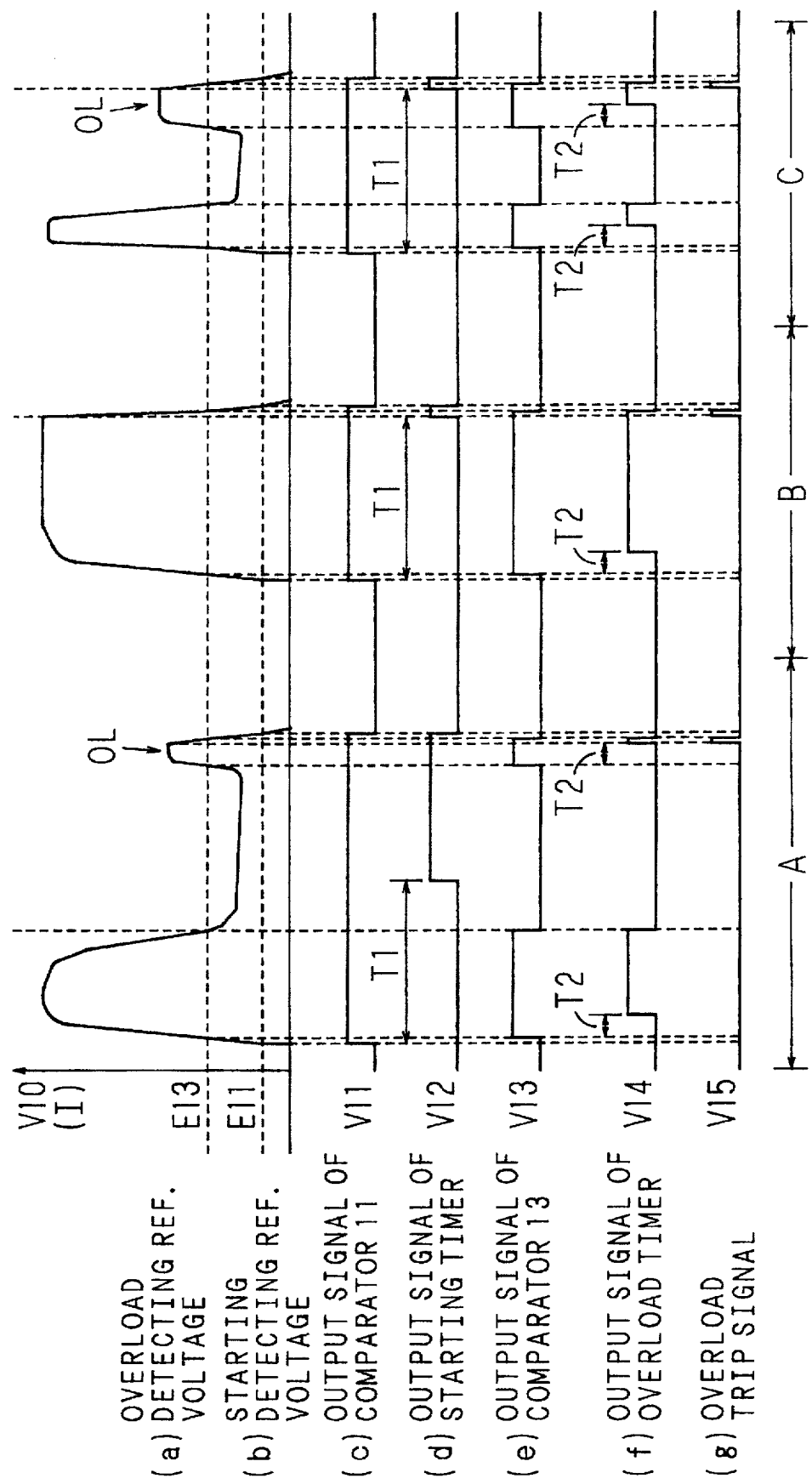
FIG. 2 is a timing chart showing a signal in each portion of the circuit shown in FIG. 1.
Figure 3:
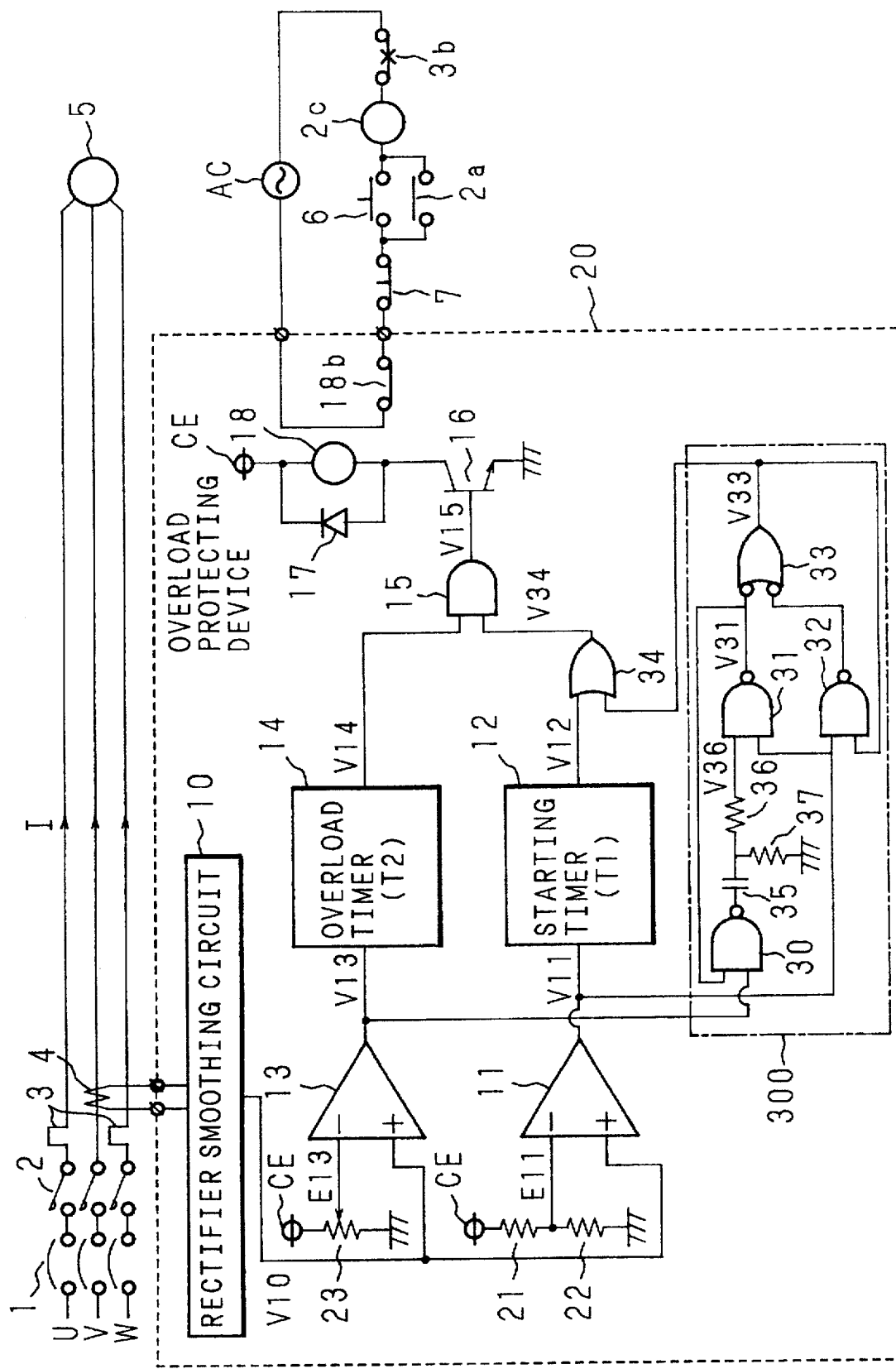
FIG. 3 is a circuit diagram showing a motor driving circuit including the overload protecting device of the present invention.

The present invention will be more particularly described with reference to the accompanying drawings which illustrates the embodiments of the invention:

FIG. 3 shows circuit diagram of a motor driving circuit including an overload protecting device 20 according to the present invention.

To a 3-phase motor 5 (hereinafter refereed to as a "motor") a 3-phase power source (not shown) having phases U, V and W to drive a driving mechanism such as a conveyor (not shown) through circuit breakers 1 and electromagnetic contactors 2 is supplied. A thermal relay 3 is provided in each of the U and W phase lines between the electromagnetic contactor 2 and the motor 5, and a current transformer 4 is provided in the V-phase line therebetween.

An output of the current transformer 4 is inputted to a rectifier smoothing circuit 10 as voltage detecting means, and the output voltage V10 of D.C. outputted from the rectifier smoothing circuit 10 is inputted to a positive input terminal (+) of each of a first comparator 11 as first comparing means which is used for detecting start of the motor 5 and a comparator 13 as second comparing means which is used for detecting an overload. A start detecting reference voltage E11 as a first reference voltage is applied, to a negative input terminal (−) of the first comparator 11 by causing resistances 21 and 22 to divide a voltage of a control power source CE. An overload detecting reference voltage E13 as a second reference voltage is applied to a negative input terminal (−) of the second comparator 13 by causing the variable resister 23 to divide the voltage of the control power source CE.

An output signal V11, which is a first comparison result signal, of the first comparator 11 is inputted to a starting timer 12 as a first clocking means. An output signal V13, which is a second comparison result signal, of the second comparator 13 is inputted to an overload timer 14 as a second clocking means. The starting timer 12 is an on-delay timer designed to prevent a motor current cut-off likely to occur as a result of mistaking a starting current of the motor 5 for an overload. It clocks a predetermined period of time T1 longer than the starting time of the motor 5. The overload timer 14 is an on-delay timer which clocks a period of time for which overloading continues, thereby preventing the motor current from being cut off because of an instantaneous overload. It also clocks a predetermined period of time T2 shorter than the period of time T1 set for the starting timer 12, and outputs an output signal V14 as an overload detecting signal when the period of time T2 is clocked.

An output signal V12 of the starting timer 12 is inputted to one input terminal of an OR circuit 34, and the output signal of it is inputted to one input terminal of the AND circuit 15. The output signal V14 of the overload timer 14 is inputted to the other input of the AND circuit 15. The output signal V11 of the comparator 11 is also inputted to one input terminal of a NAND circuit 31 as a first circuit of a transient finish detecting circuit 300 and that of a NAND circuit 32. The output signal V13 of the second comparator 13 is inputted to one input terminal of a NAND circuit 30 which is also a component of the transient finish detecting circuit 300.

An output signal V15 of the AND circuit 15 is inputted to the base of a transistor 16 whose emitter is grounded. A collector of the transistor 16 is connected to the control power source CE through an overload trip relay 18 as a current cutting-off means. A flywheel diode 17 is connected to the overload trip relay 18 in parallel. A series circuit of a normally closed contact 18b of the overload trip relay 18, a stop button switch 7, a starting button switch 6, an electromagnetic coil 2c of the electromagnetic contactor 2, and the normally closed contact 3b of the thermal relay 3 is connected between one terminal of an A.C. control power source AC and the other terminal thereof. A self-holding normally open contact 2a of the electromagnetic contactor 2 is connected to the starting button switch 6 in parallel.

As described above, the output signal V11 of the comparator 11 is inputted to the transient finish detecting circuit 300, which means that it is connected to an input terminal of each of the NAND circuits 31 and 32. The output signal V13 of the comparator 13 is also inputted to one input terminal of the NAND circuit 30 which constitutes the transient finish detecting circuit 300. The output signal of the NAND circuit 30 is inputted to the other input terminal of the NAND circuit 31 through a series circuit of a capacitor 35 and a resistance 36. The midpoint between the capacitor 35 and the resistance 36 is grounded through a resistance 37.

An output signal V31 of the NAND circuit 31 is inputted to the other input terminal of the NAND circuit 30 and an input terminal of a NAND circuit 33 as a second circuit. The output signal of the NAND circuit 32 is inputted to the other input terminal of the NAND circuit 33, and an output signal V33 of the NAND circuit 33 is inputted to the other input terminal of 15 the NAND circuit 32 and the other input terminal of the OR circuit 34. The AND circuit 15, the NAND circuits 30, 31, 32 and 33, the capacitor 35, and the resistances 36 and 37 constitute the transient finish detecting circuit 300 for detecting the finish of transient of the motor 5.

In this way the rectifier smoothing circuit 10, the resistances 21 and 22, the variable resister 23, the comparators 11 and 13, the starting timer 12, the overload timer 14, the AND circuit 15, the transistor 16, the overload trip relay 18, the flywheel diode 17, the normally closed contact 18b, and the transient finish detecting circuit 300 constitute the overload protecting device 20 of the present invention.

Figure 4:
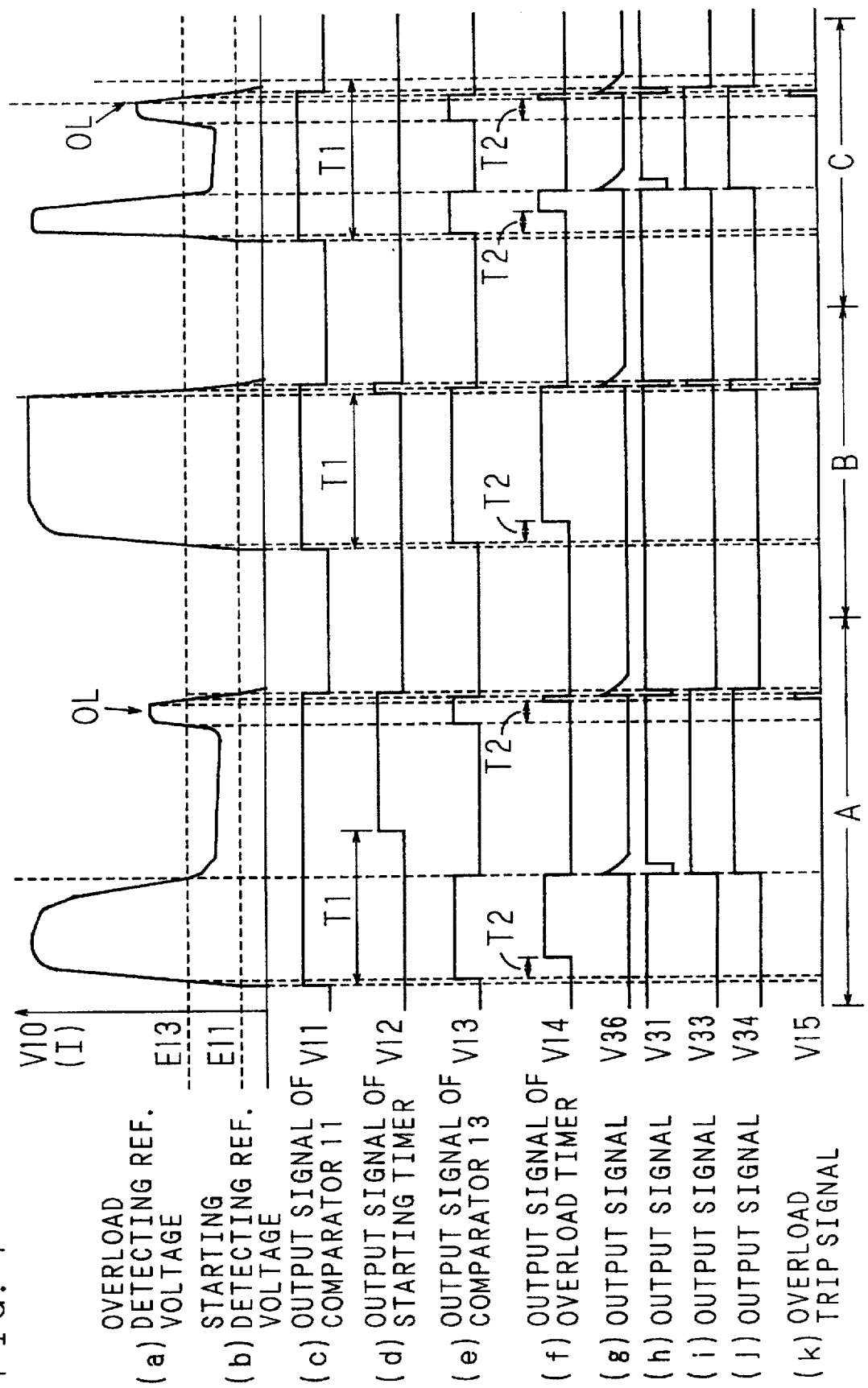
FIG. 4 is a timing chart showing a signal in each portion of the circuit shown in FIG. 3.

The operation of the overload protecting device 20 will be described with reference to FIG. 4 showing the timing chart of a signal in each portion:

When the starting button switch 6 is closed with the circuit breaker 1 being closed, the electromagnetic coil 2c is excited to close the electromagnetic contactor 2. In this way the motor 5 is started with the supply of a 3-phase motor current I. When the motor 5 is started, the current transformer 4 detects the motor current I, which is inputted to the rectifier smoothing circuit 10. The rectifier smoothing circuit 10 outputs the output voltage V10 in proportion to the motor current I.

The comparator 11 compares the output voltage V10 of the rectifier smoothing circuit 10 with the start detecting reference voltage E11 divided by the resistances 21 and 22 as shown in FIG. 4(b). When the result of comparison becomes V10>E11, the output signal V11 of the comparator 11 turns into H (high) level, which indicates that the start of the motor 5 has been detected. The output signal V11 is kept at the H level as shown in FIG. 4(c) while the motor current I flows.

When the output signal V11 turns into H level, the starting timer 12 starts to clock a predetermined period of time T1, and when it finishes clocking it, the output signal V12 of the starting timer 12 turns into H level as shown in FIG. 4(d). When an excessive amount of current flows at the starting moment of the motor 5, the comparator 13 outputs an output signal V13 at H level as shown in FIG. 4(e), but when acceleration as a starting operation finishes, the signal V13 of the comparator 13 turns into L level. When the output signal V13 of the comparator 13 turns into L level, the output signal of the NAND circuit 30 turns into H level, and the output signal of the NAND circuit 30 is differentiated by the capacitor 35 and the resistance 37, so that a saw tooth pulse V36 is generated as shown in FIG. 4(g) and is inputted to the NAND circuit 31.

The output signal V31 of the NAND circuit 31 turns into a negative pulse shown in FIG. 4(h) through a NAND (nonconjunction) operation of a saw tooth pulse V36 with the output signal V11 shown in FIG. 4(c) which turns into H level after the motor 5 is started. While the output signal V11 is kept at H level, the output signal V31 of the NAND circuit 31 is held by a holding circuit which is constituted with the NAND circuits 32 and 33. The output signal V33 of the NAND circuit 33 is kept at the H level from a time point when the output signal V10 corresponding to the starting current of the motor 5 drops below the overload detecting reference voltage E13 up to a time point when the motor current I is cut off. After the motor 5 is started, the output signal V34 of the OR circuit 34 turns into H level as shown in FIG. 4(j) either when the output signal V33 of the NAND circuit 33 turns into H level or when the output signal V12 of the starting timer 12 turns into H level after clocking of the predetermined period of time T1.

In this way, when the output signal V34 of the OR circuit 34 and the output signal V14 of the overload timer 14 both turns into H level, the output signal V15 of the AND circuit 15 turns into H level. As a result, the transistor 16 is turned on, thereby exciting the coil of the overload trip relay 18 to open the normally closed contact 18b. The opening of the normally closed contact 18b demagnetizes the electromagnetic coil 2c of the electromagnetic contactor 2. Thus the motor current I is cut off, and the motor 5 stops. The driving mechanism (not shown) such as a conveyor driven by the motor 5 is protected from being overloaded.

(A) in FIG. 4 indicates that during the period of time shown therein an overload OL is generated after the clocking the predetermined period of time T1 of the starting timer 12. In this case, at the, time point when the overload timer 14 finishes clocking of predetermined period of time T2 after the generating the overload OL, the overload trip signal V15 turns into H level as shown in FIG. 4(k). Thus the motor current I of the motor 5 is cut off.

(B) in FIG. 4 indicates that during the period of time shown therein an overloading OL occurs at the start of the motor 5. When the starting timer 12 clocks the predetermined period of time T1, the overload trip signal V15 turns into H level as shown in FIG. 4(k), the motor current I is cut off. During the periods of time shown in periods (A) and (B) in FIG. 4, the motor current is cut off in the same manner as under the known overload protecting device.

(C) in FIG. 4 indicates that during the period of time shown therein an overload OL is generated before the starting timer 12 finishes clocking the predetermined period of time T1 after the motor 5 is started. In this case, irrespective of whether the starting timer 12 finishes its clocking or not, the output Signal of the NAND circuit 33 in the transient finish detecting circuit 300 turns into H level as shown in FIG. 4(i), so that the output signal V34 of the OR circuit 34 turns into H level as shown in FIG. 4(j). As a result, when the overload timer 14 finishes its clocking, and its output signal V14 turns into H level (this time point being within the period of time for which the starting timer 12 is clocking the predetermined period of time), the overload trip signal V15 turns into H level as shown in FIG. 4(k). Thus the motor current I of the motor 5 is cut off.

As is evident from the foregoing, the overload protecting device 20 of the present invention operates in the same manner during the periods of time shown in periods (A) and (B) in FIG. 4 as the conventional overload protecting device shown in FIG. 3. However, during the period of time shown in (C) in FIG. 4, the overload protection device of the present invention can cut off the supply of the motor current I when the overload trip signal V15 turns into H level even before the starting timer 12 finishes clocking the predetermined period of time. When during the period of time (C) overloading occurs, the conventional overload protecting device cannot cut off the supply of the motor current I until the staring timer 12 finishes its clocking but the overload protecting device of the present invention can immediately cut off the supply of the motor current I to the motor 5, thereby protecting the driving mechanisms from being overloaded.

In the embodiments described above the driving mechanism is driven by a 3-phase motor, but the present invention can be applied to driving mechanisms driven by a single-phase motor or any other kinds of motor.

As is evident from the foregoing, according to the present invention, even when overloading occurs before the starting timer finishes clocking the predetermined period of time lapsing after the motor is started, the supply of the motor current is immediately cut off when the overload timer finishes its clocking, and outputs the overload detecting signal even before the start finish signal is generated. In this way the driving mechanism driven by a motor is protected from being overloaded irrespective of any time when an overload occurs. This ensures that even when an excessively long period of time is set for the starting timer, the motor is nevertheless effectively protected from being overloaded.

The starting time of the motor differs with the load conditions of the motor, the ambient temperatures, the source voltage, etc., so that the conventional overload protecting devices have the disadvantage of changing the predetermined time depending upon the varying circumstantial conditions, load condition of the motor, the ambient temperatures, the source voltage, etc., so as to secure a proper length of time to be clocked by the starting timer. In contrast, the present invention ensures that the supply of the motor current is immediately cut off even when overloading occurs before the starting timer finishes clocking the predetermined period of time, thereby eliminating the necessity of changing the period of time to be clocked by the starting timer. Thus it is not necessary to change the predetermined period of time irrespective of varying circumstantial conditions, and the motors can be certainly protected from being overloaded.

As this invention may be embodied in several forms without departing from the spirit of essential characteristics thereof, the present embodiments are therefore illustrated and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An overload protecting device comprising:

voltage detecting means for detecting a voltage relating to a current supplied to a motor;

first reference voltage generating means for generating a first reference voltage higher than a first voltage detected by said voltage detecting means during the normal operation of said motor and lower than a second voltage detected by said detecting means during the transients of said motor;

second reference voltage generating means for generating a second reference voltage higher than said first reference voltage and lower than said second voltage;

first comparing means for comparing a voltage detected by said voltage detecting means with said first reference voltage, and outputting a first comparison result when said detected voltage is higher than said first reference voltage;

second comparing means for comparing a voltage detected by said voltage detecting means with said second reference voltage, and outputting a second comparison result signal when said detected voltage is higher than said second reference voltage;

first clocking means for clocking a first period of time lapsing since the generation of said first comparison result signal;

second clocking means for clocking a second period of time lapsing since the generation of said second comparison result signal, said second period of time being shorter than said first period of time;

a motor transient finish detecting circuit for detecting the finish of a transient of said motor and outputting a transient finish signal when the generation of said second comparison result signal finishes during the generation of said first comparison result signal; and current cutting-off means for cutting off the supply of a motor current when said second clocking means finishes clocking the period of time after said first period of time is clocked by said first clocking means, and when said second clocking means finishes clocking the second period of time after said transient finish signal is generated during the clocking of the first period of time by said first clocking means.

2. The overload protecting device as set forth in claim 1, wherein said transient finish detecting circuit comprises:

a first circuit for generating a signal having a predetermined time width at the time when the output of said second comparison result signal from said second comparing means finishes; and a second circuit for making said current cutting-off means cut off the supply of a current to the motor when said second clocking means finishes clocking the second period of time after output of said motor transient finish signal during the clocking of the first period of time by said first clocking means by cancelling clocking of said first clocking means during the period of time from the generation of signal the having a predetermined time width from said first circuit up to the termination of the generation of said first comparison result signal.

* * * * *